(12) United States Patent
Andre Poyaud et al.

(10) Patent No.: US 11,342,088 B2
(45) Date of Patent: May 24, 2022

(54) METHOD FOR CALCULATING A PCI MARGIN ASSOCIATED WITH A LOADING PATTERN OF A NUCLEAR REACTOR, ASSOCIATED SYSTEM, COMPUTER PROGRAM AND MEDIUM

(71) Applicant: FRAMATOME, Courbevoie (FR)

(72) Inventors: Gilles Andre Poyaud, Lyons (FR); Isabelle Galland, Lyons (FR)

(73) Assignee: FRAMATOME, Courbevoie (FR)

( * ) Notice: Subject to any disclaimer, the term of this patent is extended or adjusted under 35 U.S.C. 154(b) by 509 days.

(21) Appl. No.: 16/312,280

(22) PCT Filed: Jun. 20, 2017

(86) PCT No.: PCT/EP2017/065110
§ 371 (c)(1),
(2) Date: Dec. 20, 2018

(87) PCT Pub. No.: WO2017/220592
PCT Pub. Date: Dec. 28, 2017

(65) Prior Publication Data
US 2019/0206581 A1    Jul. 4, 2019

(30) Foreign Application Priority Data
Jun. 22, 2016  (FR) ................. FR 16 01000

(51) Int. Cl.
*G21D 3/00* (2006.01)
*G21C 3/04* (2006.01)
(Continued)

(52) U.S. Cl.
CPC ............ *G21D 3/001* (2013.01); *G21C 3/047* (2019.01); *G21C 7/00* (2013.01); *G21C 17/00* (2013.01);
(Continued)

(58) Field of Classification Search
CPC ........ G21D 3/001; G21D 3/002; G21D 3/004; G21D 3/005; G21C 7/00; G21C 17/00;
(Continued)

(56) References Cited

U.S. PATENT DOCUMENTS 3,104,219 A * 9/1963 Sulzer .................... G21C 3/326
                                                                    376/435
3,403,075 A * 9/1968 Fiebelmann ........... G21C 15/02
                                                                    376/367
(Continued)

OTHER PUBLICATIONS

Corresponding Search Report PCT/EP2017/065110.
(Continued)

*Primary Examiner* — Darlene M Ritchie
(74) *Attorney, Agent, or Firm* — Davidson, Davidson & Kappel, LLC (57) ABSTRACT

A method for calculating a PCI margin associated with a loading pattern of a nuclear reactor including a core into which fuel assemblies are loaded according to the loading pattern is implemented by an electronic system. The fuel assemblies include fuel rods each including fuel pellets of nuclear fuel and a cladding surrounding the pellets. This method includes calculating a reference principal PCI margin for a reference loading pattern of the fuel assemblies in the core; calculating a reference secondary PCI margin for the reference pattern; calculating a modified secondary PCI margin for a modified loading pattern of the fuel assemblies in the core, and calculating a modified principal PCI margin for the modified pattern, depending on a comparison of the modified secondary PCI margin with the reference secondary PCI margin.

13 Claims, 5 Drawing Sheets

(51) Int. Cl.
  *G21C 7/00*  (2006.01)
  *G21C 17/00* (2006.01)
  *G21C 19/20* (2006.01)
(52) U.S. Cl.
  CPC ........... *G21C 19/205* (2013.01); *G21D 3/004* (2019.01); *Y02E 30/30* (2013.01)
(58) Field of Classification Search
  CPC ....... G21C 19/205; G21C 3/047; Y02E 30/30; Y02E 30/00; G06F 2111/10; G06F 30/23
  See application file for complete search history.

(56) References Cited

U.S. PATENT DOCUMENTS

| | | | | |
|---|---|---|---|---|
| 4,581,196 | A * | 4/1986 | Sakagami | G21C 7/36 376/216 |
| 5,091,139 | A * | 2/1992 | Chao | G21D 3/08 376/216 |
| 5,493,590 | A * | 2/1996 | Sollychin | G21C 3/322 376/401 |
| 8,149,983 | B2 * | 4/2012 | Beard, Jr. | G21D 3/001 376/305 |
| 2001/0036242 | A1 * | 11/2001 | Hirukawa | G21C 17/108 376/245 |
| 2006/0129362 | A1 * | 6/2006 | Mahe | G21D 3/001 703/2 |
| 2007/0213959 | A1 * | 9/2007 | Kropaczek | G21D 3/04 703/1 |
| 2007/0280401 | A1 * | 12/2007 | Beard | G21C 17/00 376/419 |
| 2008/0137792 | A1 * | 6/2008 | Kropaczek | G21D 3/001 376/245 |
| 2009/0080585 | A1 | 3/2009 | Farawila | |
| 2010/0260300 | A1 * | 10/2010 | Andre Poyaud | G21D 3/001 376/245 |
| 2011/0246153 | A1 | 10/2011 | Schultz et al. | |
| 2018/0366235 | A1 * | 12/2018 | Hanada | G05B 23/02 |

OTHER PUBLICATIONS

Zhou et al. "Modelling of pellet interaction during power ramps", Pellet—Clad Interaction in Water Reactor Fuels, Mar. 11, 2004, pp. 519-530.

* cited by examiner

METHOD FOR CALCULATING A PCI MARGIN ASSOCIATED WITH A LOADING PATTERN OF A NUCLEAR REACTOR, ASSOCIATED SYSTEM, COMPUTER PROGRAM AND MEDIUM

The present invention relates to a method for calculating a PCI margin associated with a loading pattern of a nuclear reactor comprising a core in which fuel assemblies are loaded, the fuel assemblies comprising fuel rods each including nuclear fuel pellets and a cladding surrounding the pellets.

The present invention also relates to an associated electronic calculating system, and a computer program including software instructions which, when executed by a computer, implement such a method.

The invention for example applies to light water nuclear reactors, whether using pressurized water or boiling water.

BACKGROUND

A large number of these reactors are currently used around the world.

It may be useful, in particular in countries such as France, where more than 50% of electricity is produced using nuclear reactors, for the overall power supplied by these reactors to vary in order to adapt to the needs of the electrical grid that they supply.

In particular, it is desirable to be able to operate the nuclear reactors at an intermediate power during a period during which the demand of the grid is low, typically from several days to at least 2 months, before returning to the nominal power.

For all that, such an operation of a nuclear reactor, which would make it possible to better use its capacities, must not cause a safety problem, in particular in case of accidental operational transients that may occur for example during, or shortly after, the operation at intermediate power.

SUMMARY OF THE INVENTION

One aim of the invention is to resolve this problem by providing a method allowing to calculate a PCI margin associated with a loading pattern of a nuclear reactor, making it possible to better exploit the capabilities of the reactor, while retaining a safe operation.

To that end, a method is provided for calculating a PCI margin associated with a loading pattern of a nuclear reactor comprising a core in which fuel assemblies are loaded according to the loading pattern, the fuel assemblies comprising fuel rods each including nuclear fuel pellets and a cladding surrounding the pellets, the method being implemented by a computer and comprising the following steps:
b) calculating a reference principal PCI margin for a reference loading pattern of the fuel assemblies in the core,
c) calculating a reference secondary PCI margin for the reference pattern,
d) calculating a modified secondary PCI margin for a modified loading pattern of the fuel assemblies in the core,
e) calculating a modified principal PCI margin for the modified pattern, depending on a comparison of the modified secondary PCI margin with the reference secondary PCI margin.

The calculating method then makes it possible to calculate the value of the PCI margin more precisely, taking account of a variability of the loading patterns of the fuel assemblies in the core of a nuclear reactor for a given radiation cycle, relative to a reference pattern.

The reference pattern for example defines a nominal load, also called breakeven load, according to which, from one radiation cycle to another, the fuel assemblies present in the core are similar, in particular in terms of initial enrichment of the nuclear material, and are loaded into the core according to a reproducible loading pattern. The reference pattern then corresponds to an operating cycle of the reactor called breakeven cycle.

The modified pattern makes it possible to provide flexibility relative to the reference pattern: it for example defines a transitional load to or from the nominal load, such as a load corresponding to the startup of a first core, a rise to the breakeven point, a change of management of the operation of the reactor, or to an end-of-life cycle of a reactor, or a variation relative to the reference pattern. The modified pattern is also called flexibility pattern.

The modified pattern then differs from the reference pattern by at least one fuel assembly 16 loaded into the core, some fuel assemblies 16 for example not being loaded into the core according to the modified loading pattern and being replaced by different fuel assemblies, for example by the nature of the fissile material or its enrichment or the irradiation history of the replacement fuel assemblies.

Alternatively, the fuel assemblies 16 loaded into the core 2 are identical between the modified pattern and the reference pattern, the modified pattern then differing from the reference pattern only by the position of at least two fuel assemblies 16 in the core 2.

According to advantageous embodiments of the invention, the method comprises one or more of the following features, considered alone or according to any technically possible combinations:

when the modified secondary PCI margin is greater than or equal to the reference secondary PCI margin, the modified principal PCI margin is equal to the reference principal PCI margin; and when the modified secondary PCI margin is less than the reference secondary PCI margin, the modified principal PCI margin is less than the reference principal PCI margin;

when the modified secondary PCI margin is less than the reference secondary PCI margin, the modified principal PCI margin is equal to the reference principal PCI margin reduced by a corrective factor depending on the deviation between the modified secondary PCI margin and the reference secondary PCI margin;

the corrective factor depends on a ratio between the modified secondary PCI margin and the reference secondary PCI margin and is strictly between 0 and 1;

step b) comprises the following sub-steps:
b1) simulating at least one operating transient of the nuclear reactor,
b2) calculating the value reached by at least one physical quantity during the operating transient in at least part of a cladding of a fuel rod, and
b3) determining, as reference principal PCI margin, the deviation between the maximum value reached by said value calculated in sub-step b2) during the transient and a technological limit of the fuel rod;

the transient simulated in sub-step b1) is a transient chosen from among the group consisting of: an excessive load increase, an uncontrolled withdrawal of at least one group of control clusters, a fall of one of the control clusters, and an uncontrolled dilution of boric acid;

the method comprises, before step b), the step of: a) determining a rupture value of the physical quantity characterizing a rupture of the cladding;

step a) includes:
   subjecting previously irradiated fuel rods to experimental nuclear power ramps,
   calculating the values reached by the physical quantity in at least one cladding broken during a power ramp, and
   selecting the rupture value as being the minimum value from among the calculated values reached;

each of steps c) and d) includes, for each fuel assembly, the following sub-steps:
   i) simulating an evolution of the operation of the nuclear reactor by applying, to the fuel rods, a nuclear power ramp from the nil power,
   ii) calculating the values reached by a physical quantity in the claddings of the fuel rods,
   iii) comparing the values reached to the rupture value,
   iv) determining a power at break equal to:
      I) the power associated with the rupture value, if a minimum value from among the values reached calculated in sub-step ii) is equal to the rupture value, or
      II) infinity, if no value, from among the values reached calculated in sub-step ii), is equal to the rupture value,
   v) evaluating a power margin by difference between the power at break determined in sub-step iv) and an estimated maximum power in the fuel assembly,
   the corresponding secondary PCI margin, calculated during each of steps c) and d), is equal to the minimum margin from among the power margins evaluated for the fuel assemblies in sub-step v);

neutronic calculations and thermomechanical calculations are done to calculate each PCI margin, and the neutronic calculations and the thermomechanical calculations are coupled to calculate a corresponding principal PCI margin, the thermomechanical calculations being uncoupled from the neutronic calculations to calculate a corresponding secondary PCI margin;

the method further comprises the following step: f) determining a limit value to trigger an emergency stop and/or an alarm from the calculated principal PCI margin and for the considered loading pattern of the fuel assemblies in the core;

the physical quantity is chosen from among the group consisting of: a constraint or a constraint function in the cladding; and a deformation energy density in the cladding;

the method further comprises operating the nuclear reactor by using the calculated principal PCI margin for the considered loading pattern of the fuel assemblies in the core.

A computer program is also provided including software instructions which, when executed by a computer, implement a method as defined above.

An electronic system for calculating a PCI margin associated with a loading pattern of a nuclear reactor comprising a core in which fuel assemblies are loaded according to the loading pattern is also provided, the fuel assemblies comprising fuel rods each including nuclear fuel pellets and a cladding surrounding the pellets, the system comprising:
   a first calculating module configured to calculate a reference principal PCI margin for a reference loading pattern of the fuel assemblies in the core,
   a second calculating module configured to calculate, on the one hand, a reference secondary PCI margin for the reference pattern, and on the other hand, a modified secondary PCI margin for a modified loading pattern of the fuel assemblies in the core,
   a comparison module configured to compare the modified secondary PCI margin with the reference secondary PCI margin,
   the comparison module further being configured to calculate a modified principal PCI margin for the modified pattern, depending on said comparison of the modified secondary PCI margin with the reference secondary PCI margin.

BRIEF SUMMARY OF THE DRAWINGS

The invention will be better understood upon reading the following description, provided solely as a non-limiting example and done in reference to the appended drawings, in which.

DETAILED DESCRIPTION

Figure 1:
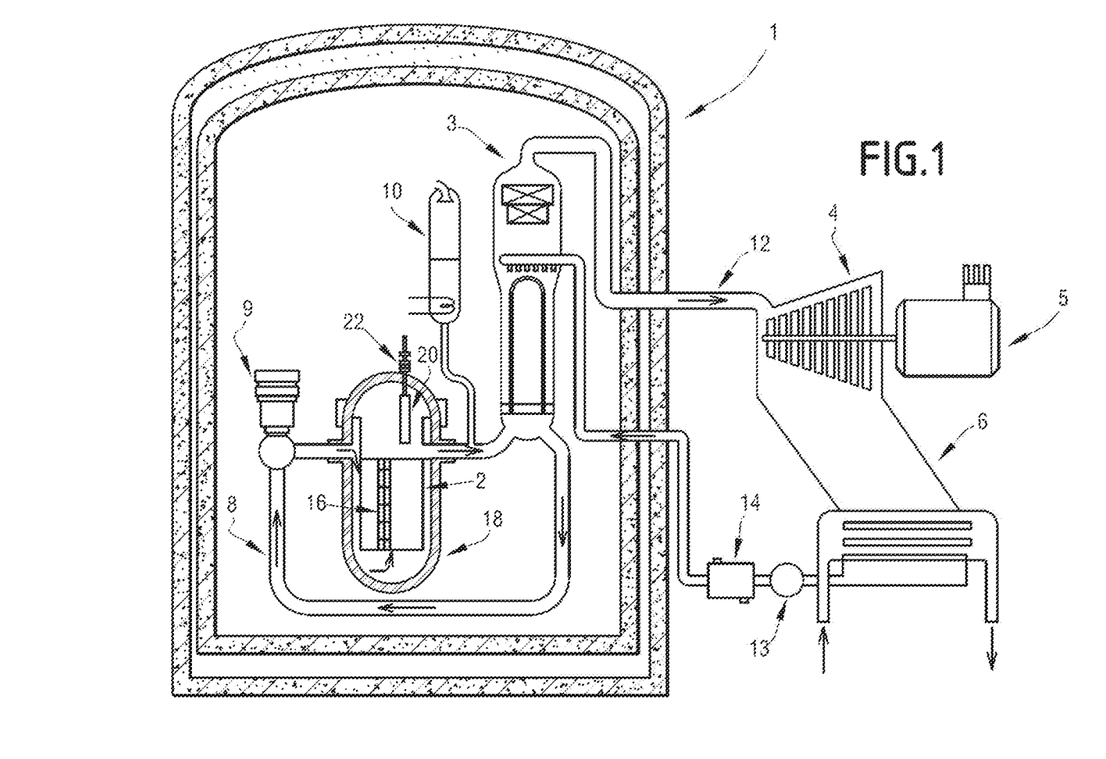
FIG. 1 is a schematic view of a pressurized water nuclear reactors.

In FIG. 1, a pressurized water nuclear reactor 1 comprises, as is known in itself, a core 2, a steam generator 3, a turbine 4 coupled to an electrical energy generator 5, and a condenser 6.

The nuclear reactor 1 comprises a primary circuit 8 equipped with a pump 9 and in which pressurized water circulates, along a path embodied by the arrows in FIG. 1. This water in particular rises through the core 2 to be heated therein while providing the refrigeration of the core 2.

The primary circuit 8 further comprises a pressurizer 10 making it possible to pressurize the water circulating in the primary circuit 8.

The water of the primary circuit 8 also supplies the steam generator 3, where it is cooled while providing the vaporization of water circulating in a secondary circuit 12.

The steam produced by the steam generator 3 is channeled by the secondary circuit 12 toward the turbine 4, then toward the condenser 6, where this steam is condensed by indirect heat exchange with the cooling water circulating in the condenser 6.

The secondary circuit 12 comprises, downstream from the condenser 6, a pump 13 and a heater 14.

Traditionally, the core 2 comprises fuel assemblies 16 that are loaded in a vessel 18 according to a loading pattern. A single assembly 16 is shown in FIG. 1, but the core 2 for example comprises 157 assemblies 16.

The reactor 1 comprises control clusters 20 that are positioned in the vessel 18 above certain fuel assemblies 16. A single control cluster 20 is shown in FIG. 1, but the core 2 for example comprises around sixty control clusters 20.

The control clusters 20 are movable by mechanisms 22 to be inserted into the fuel assemblies 16 that they overhang.

Traditionally, each control cluster 20 comprises rods, at least some of which include a material absorbing the neutrons.

Thus, the vertical movement of each control cluster 20 makes it possible to adjust the reactivity of the reactor 1 and allows variations of the overall power P supplied by the core 2 from the nil power to the nominal power PN, as a function of the pushing of the control clusters 20 into the fuel assemblies 16.

Some of said control clusters 20 are intended to regulate the operation of the core 2, for example in terms of power or temperature, and are called regulating clusters. Others are intended to stop the reactor 1 and are called stop clusters.

The control clusters 20 are joined into groups based on their nature and intended use. For example, for reactors of type 900 Mwe CPY, these groups are called G1, G2, N1, N2, R, SA, SB, SC, SD. Groups G1, G2, N1 and N2, called power groups, are used overlapping for power regulation, and group R is used for temperature regulation. Groups SA, SB, SC and SD are used for the emergency stopping of the reactor 1.

Figure 2:
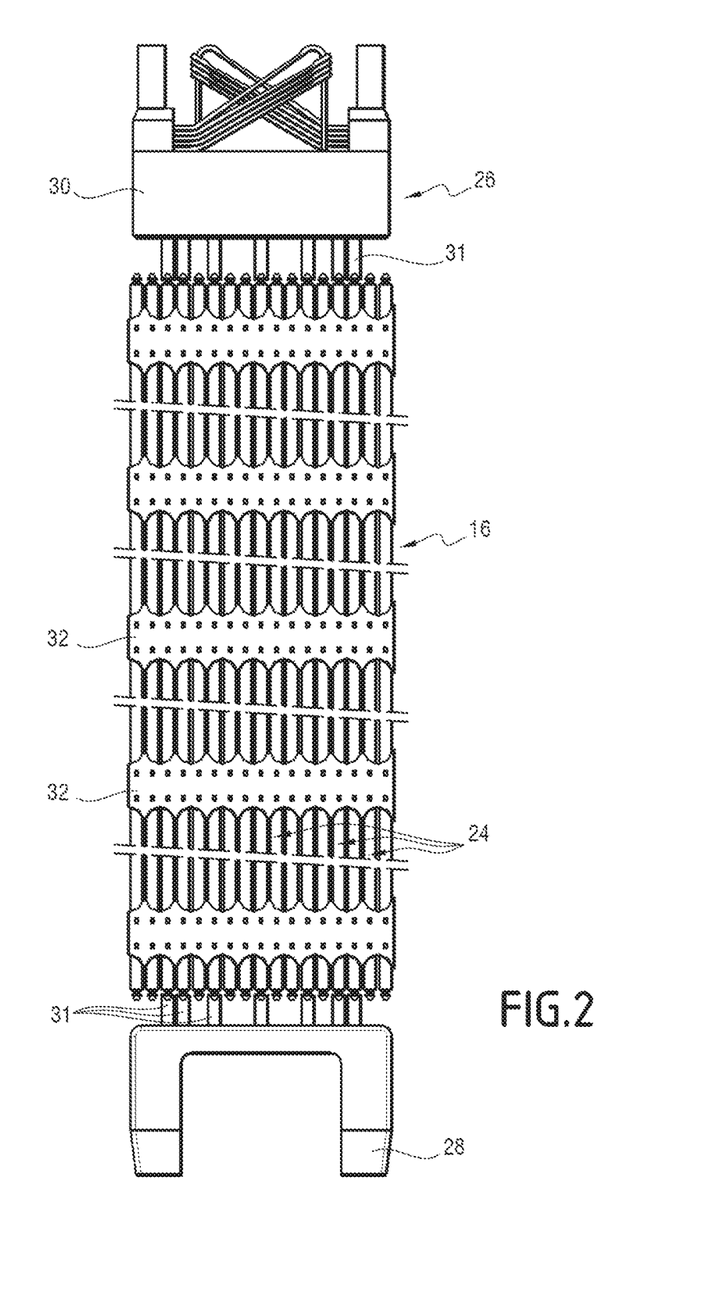
FIG. 2 is a lateral schematic view of a fuel assembly of the core of the reactor of FIG. 1.

As illustrated by FIG. 2, each fuel assembly 16 traditionally comprises an array of nuclear fuel rods 24 and a support skeleton 26 for the fuel rods 24.

The skeleton 26 traditionally comprises a lower end-piece 28, an upper end-piece 30, an array of guide tubes 31 connecting the two end-pieces 28 and 30 and designed to receive the rods of the control clusters 20 and to position spacer-forming grids 32 to position the arrays of fuel rods 24 and guide tubes 31.

Figure 3:
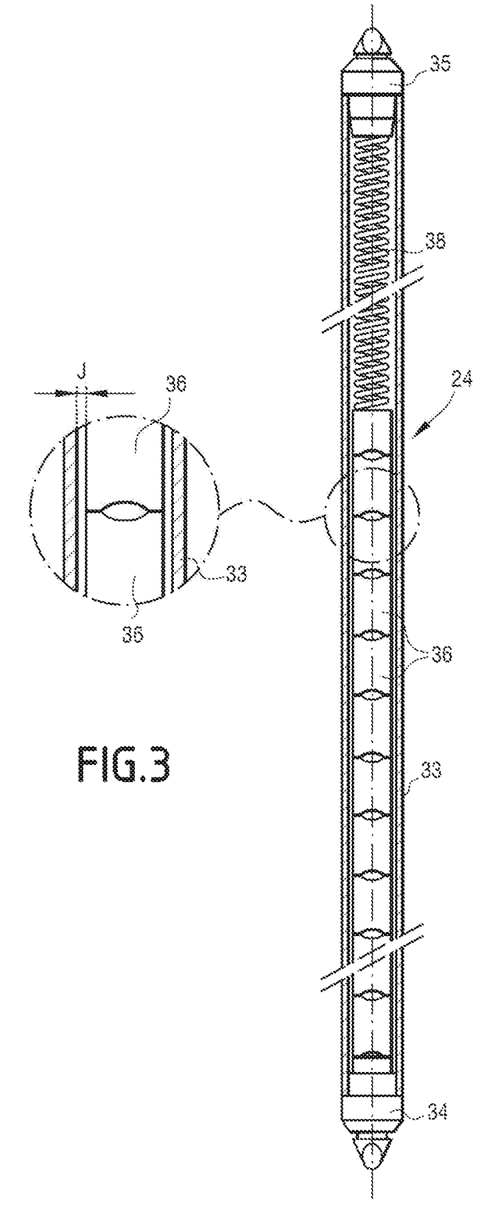
FIG. 3 is a longitudinal sectional schematic view of a fuel rod of the assembly of FIG. 2.

As illustrated by FIG. 3, each fuel rod 24 traditionally comprises a cladding 33 in the form of a tube closed at its lower end by a lower stopper 34 and at its upper end by an upper stopper 35. The fuel rod 24 comprises a series of pellets 36 stacked in the cladding 33 and bearing against the lower stopper 34. A maintaining spring 38 is positioned in the upper segment of the cladding 33 to bear on the upper stopper 35 and on the upper pellet 36.

Traditionally, the pellets 36 have a base of fissile material, for example uranium oxide, and the cladding 33 is made from zirconium alloy.

In FIG. 3, which corresponds to a fuel rod 24 derived from manufacturing and before irradiation, radial play J exists between the pellets 36 and the cladding 33. This is illustrated more particularly by the circled enlarged part of FIG. 3.

When the reactor 1 is going to operate, for example at its nominal power PN, the fuel rod 24 will be, according to the term used in the art, conditioned.

Conditioning is essentially characterized by the closing of the play J between the pellets 36 and the cladding 33, due to the creep of the cladding 33 and the swelling of the pellets 36.

More specifically, the following steps are for example distinguished for each fuel rod 24 during irradiation:

1) Under the effect of the pressure difference between the outside (water from the primary circuit 8) and the inside of the fuel rod 24, the cladding 33 gradually deforms by creeping radially toward the inside of the fuel rod 24. All other things being equal, the creep speed of the cladding 33 is one characteristic of its component material. Furthermore, the fission products, the majority of which are retained in the pellet 36, cause swelling of the pellet 36. During this phase, the stress exerted on the cladding 33 in terms of constraints results solely from the pressure differential existing between the outside and the inside of the fuel rod 24. The stresses in the cladding 33 are compression stresses (conventionally negative).

2) The contact between the pellet 36 and the cladding 33 begins after a length of time that essentially depends on local irradiation conditions (power, neutron flux, temperature, etc.) and the material of the cladding 33. In reality, the contact is established gradually over a period that begins with gentle contact followed by the establishment of firm contact. The increased contact pressure of the pellet 36 on the inner face of the cladding 33 leads to an inversion of the stresses in the cladding 33, which become positive and tend to exert tensile stress on the cladding 33.

3) The swelling of the pellet 36 continues, and the pellet 36 then imposes its deformation on the cladding 33 toward the outside of the fuel rod 24. In the established steady state, this expansion is slow enough for the relaxation of the material of the cladding 33 to allow an equilibrium of the forces in the cladding 33. An analysis shows that under these conditions, the level of the tensile stresses is moderate (several tens of MPa) and does not present any risk with respect to the integrity of the cladding 33.

If there is no risk of rupture of the cladding 33 in a steady state due to the thermomechanical equilibrium in the cladding 33 at fairly low stress levels, a risk appears once the power supplied by the fuel rod 24 varies greatly.

Indeed, a power increase generates a temperature increase in the fuel rod 24. Given the difference in mechanical characteristics (thermal expansion coefficient, Young's modulus) and the temperature difference between the pellet 36 of fissile material and the cladding 33 made from zirconium alloy, the pellet 36 will expand more than the cladding 33 and impose its deformation on the latter.

Furthermore, an operation at intermediate power lasting several days results in deconditioning the fuel rods 24. For the portions of the fuel rods 24 where the contact between the cladding 33 and the pellets 36 is not established, the radial play J becomes greater. Regarding the portions of the fuel rods 24 where the play J was closed, the play J can open again. In case of open play J, the compression creep of the cladding 33 by pressure effect resumes. This results in increased stresses in the cladding 33 when the accidental transient occurs.

Furthermore, the presence of corrosive fission products, such as iodine, in the space between the cladding 33 and the pellet 36 creates the conditions for corrosion under stress. Thus, the deformation imposed by the pellet 36 on the cladding 33 during a power transient, or a power variation, can cause a rupture of the cladding 33.

Yet such a rupture of the cladding 33 is not acceptable for safety reasons, since it may result in the release of fission products into the primary circuit 8.

Power transients may occur during normal operation of the reactor 1, i.e., in so-called category 1 situations. Indeed, power variations may be necessary in particular to adapt to the electrical energy needs of the power grid that the generator 5 supplies. Power transients may also occur in so-called category 2 accidental situations, such as excessive charge increase, uncontrolled withdrawal of power control cluster group(s) 20, boric acid dilution or undetected fall of control clusters 20.

Starting from the state of the balance of the margins obtained in normal operation, the acceptable operating duration and intermediate power is determined so as to guarantee the non-rupture by pellet-cladding interaction of the claddings 33 present in the core 2 in case of category 2 power transient, also called class 2 power transient.

To guarantee the integrity of the fuel rods 24 with respect to the pallet-cladding interaction, a margin is calculate with respect to the rupture risk of a cladding 33 by pellet-cladding interaction (PCI) for a loading pattern of the reactor 1; this margin is called PCI margin.

Each PCI margin is a deviation relative to a characteristic quantity of the nuclear reactor 1 and its core 2, i.e., a delta of said characteristic quantity of the nuclear reactor 1, this deviation coming from taking account of the rupture risk of the claddings 33 by the pellet-cladding interaction.

Each PCI margin is for example chosen from among the group consisting of: a power margin, a margin in a thermomechanical quantity associated with the cladding 33, a margin in an operating duration of the reactor 1 at an intermediate power. The characteristic quantity of the nuclear reactor 1, a deviation, or delta, of which is determined to calculate the PCI margin, is then the nuclear power, the thermomechanical quantity associated with the cladding 33, or the operating duration of the reactor 1 at intermediate power.

One skilled in the art will understand that the higher the PCI margin is, the lower the likelihood of rupture of a cladding 33 is.

Figure 4:
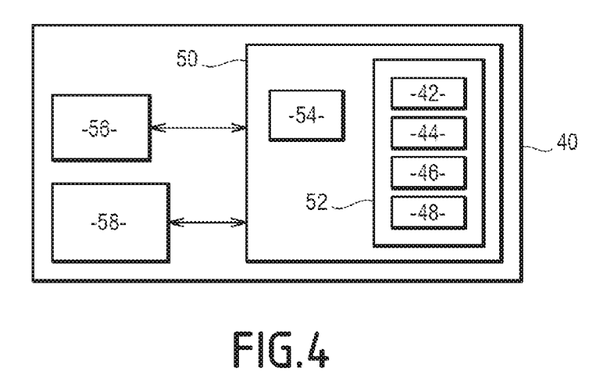
FIG. 4 is a block diagram of an electronic system for calculating a PCI margin associated with a loading pattern of the reactor of FIG. 1.

To that end, one for example uses an electronic system 40, in particular a computer system, for calculating a PCI margin associated with a loading pattern of the nuclear reactor 1, like that shown in FIG. 4.

The calculating system 40 comprises a first calculating module 42 configured to calculate a reference principal PCI margin for a reference loading pattern of the fuel assemblies 16 in the core 2.

The calculating system 40 comprises a second calculating module 44 configured to calculate, on the one hand, a reference secondary PCI margin for the reference loading pattern of the nuclear fuel assemblies, and on the other hand, a modified secondary PCI margin for a modified loading pattern of the fuel assemblies 16 in the core 2, modified relative to the reference pattern.

Each principal PCI margin and each secondary PCI margin are each a PCI margin of the aforementioned type, for example a power margin, a margin on the thermomechanical quantity, a margin on the operating duration at intermediate power. The principal PCI margin and the secondary PCI margin are for example of the same type Alternatively, the principal PCI margin and the secondary PCI margin are each of different types. The principal PCI margin is for example a margin on the thermomechanical quantity or a margin on the operating duration at intermediate power. The secondary PCI margin is for example a power margin.

One skilled in the art will understand that the secondary PCI margin is by definition the PCI margin calculated by the second calculating module 44, and that the name secondary PCI margin is not in particular related to the secondary circuit 12, the reference principal PCI margin also being calculated by the first calculating module 42.

The calculating system 40 comprises a comparison module 46 configured to compare said modified secondary PCI margin with a reference secondary PCI margin, the comparison module 46 further being configured to calculate a modified principal PCI margin for the modified pattern, depending on the result of said comparison of the modified secondary PCI margin with the reference secondary PCI margin.

When said modified secondary PCI margin is less than the reference secondary PCI margin, the comparison module 46 is configured to calculate a value of the modified principal PCI margin that is less than that of the reference principal PCI margin.

Otherwise, when said modified secondary PCI margin is greater than or equal to the reference secondary PCI margin, the modified principal PCI margin is equal to the reference principal PCI margin.

This modified principal PCI margin is supplied to the operator of the nuclear reactor 1 having to carry out the modified loading pattern for adaptation, if necessary, of its operating technical specifications, in particular the authorized operating durations at intermediate power.

The modified PCI margins, namely the modified principal PCI margin and the modified secondary PCI margin, are also called flexibility PCI margins, said PCI margins being associated with the modified pattern, also called flexibility pattern.

As an optional addition, the calculating system 40 comprises a determining module 48 configured to determine, from the value of the calculated principal PCI margin corresponding to the loading pattern of the reactor 1, a limit value to trigger an emergency stop and/or an alarm of the nuclear reactor 1, the limit value to trigger an alarm being reduced relative to or at most equal to the limit value to trigger an emergency stop.

In particular, when the loading pattern of the reactor 1 is the modified pattern, also called flexibility pattern, the limit value to trigger an emergency stop and/or an alarm of the nuclear reactor 1 is determined from the value of the calculated modified principal PCI margin, and said triggering limit value for the flexibility pattern is then reduced relative to, or at most equal to, the triggering limit value for the reference pattern.

In the example of FIG. 4, the calculating system 40 comprises an information processing unit 50, for example made up of a memory 52 and a processor 54 associated with the memory 52. In this example, it further comprises input/output means 56 and optionally a display screen 58.

In the example of FIG. 4, the first computing module 42, the second computing module 44, the comparison module 46 and, as an optional addition, the determining module 48 are each made in the form of software executable by the processor 54. The memory 52 of the information processing unit 50 is then able to store first computing software configured to compute a reference principal PCI margin for a reference loading pattern, second computing software configured to compute a reference secondary PCI margin for the reference loading pattern and a modified secondary PCI margin for the modified loading pattern, comparison software configured to compare the modified secondary PCI margin with the reference secondary PCI margin, and further to compute the modified principal PCI margin based on the comparison between the modified secondary PCI margin and the reference secondary PCI margin. The memory 52 is, optionally and additionally, able to store determining software configured to determine a limit value for triggering an emergency stop and/or an alarm of the nuclear reactor 1 from the calculated principal PCI margin corresponding to the loading pattern, reference or modified depending on whether the reactor 1 is loaded. The processor 54 of the information processing unit 50 is then able to execute the first calculating software, the second calculating software, the comparison software and, optionally and additionally, the determining software.

In an alternative that is not shown, the first calculating module 42, the second calculating module 44, the comparison module 46 and, optionally and additionally, the determining module 48 are each made in the form of a programmable logic component, such as an FPGA (Field Programmable Gate Array), or in the form of a dedicated integrated circuit, such as an ASIC (Applications Specific Integrated Circuit).

The first calculating module 42 is configured to calculate the reference principal PCI margin for the reference loading pattern, for example according to a first methodology, for example the RPM methodology, for Renovated PCI Methodology.

The first calculating module 42 is, according to this example, configured to simulate at least one operating transient of the reactor 1, calculate the value reached by a physical quantity G during the operating transient in at least one portion of a cladding 33 of the fuel rod 24, and determine, as reference principal PCI margin, the deviation between the maximum value reached by said calculated value during the transient and a technological limit of the fuel rod 24. In this methodology, the neutron (simulation of the power transient) and thermomechanical (calculation of a physical quantity in the cladding) calculations are coupled.

The physical quantity G is for example the circumferential stress $\sigma\theta$ or the radial stress $\sigma_r$ in the cladding 33. Alternatively, the physical quantity G is a function of stress(es), for example of the difference for instance between the circumferential stress $\sigma\theta$ and the radial stress $\sigma_r$. Also alternatively, the physical quantity G is the deformation energy density DED in the cladding 33.

The transient simulated by the first calculating module 42 is preferably a transient chosen from among the group consisting of:

an excessive load increase,
an uncontrolled withdrawal of at least one group of control clusters 20,
a fall of one of the control clusters 20, and
an uncontrolled boric acid dilution.

The excessive load increase corresponds to a rapid increase in the steam flow rate in the steam generator 3. Such an increase causes an imbalance between the thermal power of the core 2 and the load of the steam generator 3. This imbalance leads to cooling of the primary circuit 8. Due to the moderating and/or regulating effect of the mean temperature in the core 2 by the control clusters 20, the reactivity, and therefore the neutron flux, increase in the core 2. Thus, the overall power P supplied by the core 2 increases quickly.

The uncontrolled withdrawal of groups of control clusters 20 while the reactor is operating causes an uncontrolled increase in the reactivity. This results in a rapid increase in the overall nuclear power P and the heat flux in the core 2. Until a discharge valve or pressure release valve of the secondary circuit 12 is opened, the extraction of heat in the steam generator 3 increases less quickly than the power given off in the primary circuit 8. This results in an increase of the temperature and the pressure of the water in the primary circuit 8. To simulate this transient, a withdrawal of the power groups is assumed at the maximum speed of 72 pitches/min until complete removal of the control clusters 20 in question.

If one or several control clusters 20 fall into the core, there is an immediate reduction in reactivity and overall power P in the core 2. Without protective action, the imbalance thus caused in the primary circuit 8 and the secondary circuit 12 causes a drop in the entry temperature of the water into the core 2, as well as an increase in the nuclear power by the counter-reactions, for example by Doppler effect, and the temperature regulation, until reaching a new breakeven point between the primary circuit 8 and the secondary circuit 12. The presence in the core 2 of the nuclear reactor 1 of the control cluster(s) 20 having fallen causes a deformation of the radial power distribution, while the removal of the regulating group leads to an axial modification of the power.

The uncontrolled boric acid dilution leads to a decrease of the boron concentration of the water in the primary circuit of the reactor due to a failure of a system of the reactor 1. It causes an insertion of reactivity, which leads to a local increase of the linear power in the core 2.

The technological limit of a fuel rod 24 is established from values reached by the physical quantity in claddings during experimental power ramps, done in test reactors, on fuel rod segments representative of fuel rods 24 and previously irradiated in a nuclear power reactor and having different combustion rates. The technological limit of the physical quantity corresponds to the minimum value of the physical quantity from among the values reached during experimental tests. Below this limit, no fuel rod 24 rupture by pellet-cladding interaction is considered. Above it, the likelihood of a cladding rupture by pellet-cladding interaction is not nil.

The second calculating module 44 is configured to calculate each secondary PCI margin, for example using a second methodology different from the first methodology, for example the methodology called power at break methodology.

The second calculating module 44 is, according to this example, for each fuel assembly 16, configured to simulate an evolution of the operation of the nuclear reactor 1 by applying, to each fuel rod 24, a nuclear power ramp from the nil power, in order to calculate the values reached by a physical quantity locally in each cladding 33 of each fuel rod 24 present in the core 2 and to determine, if applicable, a local power at break equal to the power associated with the local power of the physical quantity when this value reaches the technological limit. If the technological limit is not reached, the local power at break at the considered point is infinite. In this methodology, the simulated power ramp is a theoretical ramp, independent of the neutronic studies, and the thermomechanical calculations are then uncoupled from the neutronic calculations.

The second calculating module 44 is further configured to evaluate, at each point of the core 2, a power margin by difference between the power at break calculated for a loading pattern and a local maximum power estimated at the same moment of the irradiation cycle for the considered loading pattern, the secondary PCI margin calculated according to the second methodology then depending on the minimum margin from among the power margins thus evaluated. The calculated secondary PCI margin is for example equal to the minimum margin from among said evaluated power margins.

The estimated maximum power is for example a power envelope at any point of the core 2 and taking account of all of the limiting transients. This estimated maximum power in particular takes into account power transients that may occur in so-called category 2 accidental situations.

One skilled in the art will then understand that, in the example described above, the first calculating module 42 is more generally configured to calculate a principal PCI margin according to the first methodology, called renovated PCI methodology, and that the second calculating module 44 is more generally configured to calculate a secondary PCI margin, reference or modified, according to the second methodology, called power at break methodology.

The comparison module 46 is then configured to compare the modified secondary PCI margin with said reference secondary PCI margin, and to deduce the modified principal PCI margin therefrom.

When the modified secondary PCI margin is greater than or equal to the reference secondary PCI margin, the comparison module 46 is then configured to validate, as modified principal PCI margin, associated with the modified loading pattern, the value of the reference principal PCI margin.

When the modified secondary PCI margin is less than the reference secondary PCI margin, the comparison module 46 is configured to calculate a value of the modified principal PCI margin that is less than that of the reference principal PCI margin. The modified principal PCI margin is, for example, calculated by applying a corrective factor to the reference principal PCI margin. The corrective factor is for example a positive value subtracted from the reference principal PCI margin, or a multiplicative factor strictly between 0 and 1.

The corrective factor preferably depends on the deviation between the modified secondary PCI margin and the reference secondary PCI margin. The corrective factor for example depends on a ratio between the modified secondary PCI margin and the reference secondary PCI margin. The modified principal PCI margin is then for example calculated by multiplying the reference principal PCI margin by the modified secondary PCI margin and the reference secondary PCI margin.

The modified principal PCI margin is sent to the operator needing to carry out said modified loading pattern in order to adapt, if needed, the protection thresholds of his reactor 1 that are unchanged, the operating duration at intermediate power during the radiation cycle, and therefore to best exploit the capacities of the reactor 1 while reducing the risks of damage to the fuel rods 24.

Optionally and additionally, the determining module 48 is configured to determine the limit value for triggering of an emergency stop and/or an alarm from the calculated principal PCI margin and according to the considered loading pattern, the reference principal PCI pattern being used when the loading pattern is the reference loading pattern, and the modified principal PCI pattern being used when the loading pattern is the modified loading pattern. In other words, the determining module 48 is configured to determine emergency stop and/or alarm thresholds as a function of the calculated principal PCI margin, and more generally to use the calculated principal PCI margin in order to control the reactor 1.

Figure 5:
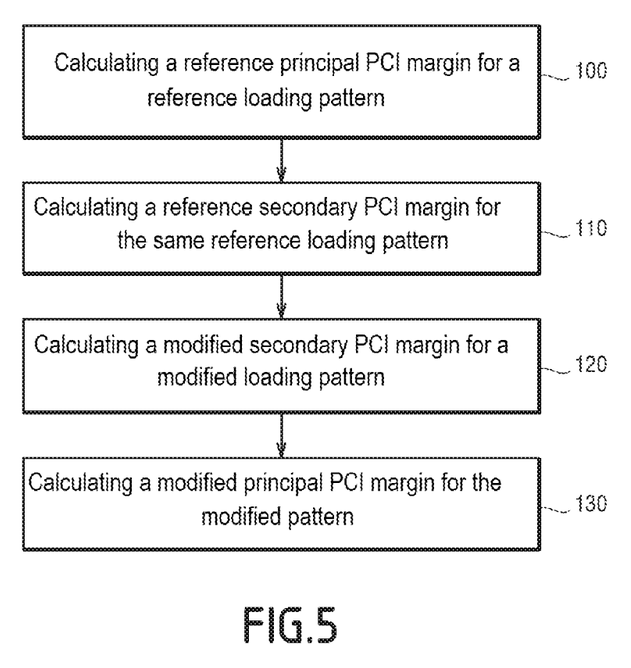
FIG. 5 is a flowchart of the method for calculating a PCI margin associated with a loading pattern of the nuclear reactor, implemented by the electronic system of FIG. 4.

The method for calculating a PCI margin associated with a loading pattern is illustrated by the flowchart of FIG. 5.

During a first step 100, a reference principal PCI margin is calculated by the first calculating module 42 for the reference loading pattern of the fuel assemblies 16 in the core 2.

The reference principal PCI margin is preferably calculated using the RPM methodology, as previously described. One skilled in the art will note that document FR 2 846 139 A1, in particular in pages 9 to 19, in light of FIGS. 5 to 11, also relates to the RPM methodology.

The pellet-cladding interaction being local by nature, the risk of cladding rupture is determined from the thermomechanical state of the fuel rods 24 in each mesh of the core 2 of the nuclear reactor 1. The thermomechanical state of a fuel rod 24 at a given moment depends on the power histories experienced by said fuel rod 24 from its first insertion in new condition into the core 2 up to the moment of the calculation.

To calculate the reference principal PCI margin, the first calculating module 42 begins, for example, by determining a value of a physical quantity G for each axial mesh of each fuel rod 24 present in the core 2 of the reactor 1.

The power histories are created by the first calculating module 42 for each fuel rod 24 present in the core 2, for example by finite element modeling of the neutronic behavior of the fuel rods 24.

The operating histories relative to each fuel rod 24 are generated for different operating modes of the core 2, namely:

the basic operation, where the overall power P of the core 2 is equal to its nominal power PN, the operation at intermediate power with the control clusters 20 inserted into the fuel assemblies 16, the operation at intermediate power with the control clusters 20 removed from the fuel assemblies 16.

The histories can be generated taking account of different intermediate power levels, for example 10% PN, 30% PN, 50% PN, etc.

The first calculating module 42 next simulates at least one operating transient of the nuclear reactor 1, such as one or several accidental operating transients of the reactor 1 that cause abrupt power variations. The accidental transients are for example simulated from simulated initial conditions corresponding to a so-called category 1 situation, at several moments in each cycle.

The simulated transients are the so-called category 2 accidental transients causing the strongest and fastest power variations in the core 2, such as the transients previously described, namely the excessive load increase, the uncontrolled withdrawal of groups of control clusters 20, while the reactor 1 is powered on, and falling cluster(s) 20.

The first calculating module 42 then calculates the maximum value reached by the physical quantity G, such as the circumferential stress $\sigma\theta$, during the operating transient in each axial mesh of each fuel rod 24, then compares, for each axial mesh, said maximum value to said technological limit and determines the PCI margin as being the difference between the technological limit and the maximum value of the physical quantity on the core 2.

During a second step 110, the reference secondary PCI margin is calculated by the second calculating module 44 for the reference loading pattern of the fuel assemblies 16 in the core 2.

The reference secondary PCI margin is preferably calculated using the second methodology, called power at break methodology.

Figure 6:
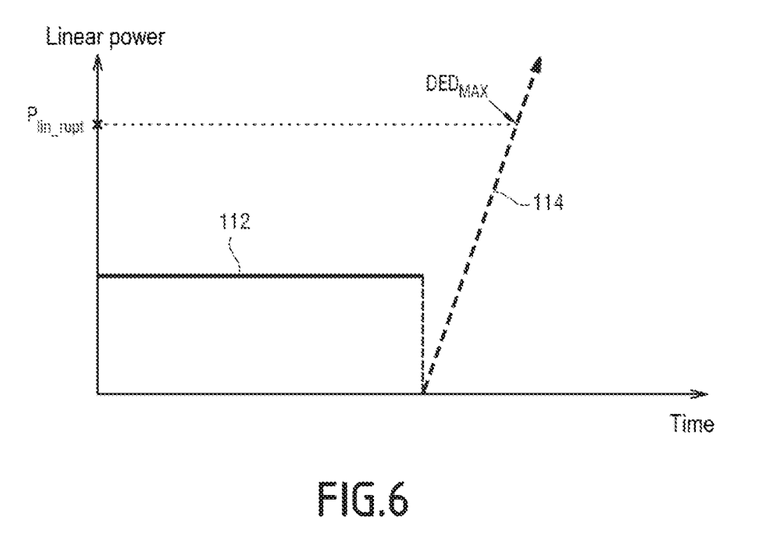
FIG. 6 is a curve illustrating the simulation of a power ramp to determine a power at break.

The second calculating module 44 then simulates, for each fuel assembly 16, an evolution of the operation of the nuclear reactor 1 by applying, to each axial mesh of each fuel rod 24, after a plateau 112 with substantially constant power, a power ramp 114 from the nil power, as shown in FIG. 6. The second calculating module 44 then calculates the values reached locally in each axial mesh of each fuel rod 24, by a physical quantity and, if the technological limit is exceeded, determines a power at break $P_{lin\_rupt}$ equal to the power associated with the physical quantity at break. In the example of FIG. 6, the power ramp 114 is a linear power ramp, and the physical quantity is the deformation energy density DED in the cladding 33, the power at break $P_{lin\_rupt}$ then corresponding to the maximum deformation energy density $DED_{MAX}$, i.e., to the value of the deformation energy density reached when the cladding 33 ruptures.

The second calculating module 44 next evaluates, for reached each axial mesh of each fuel rod 24, a power margin by difference between the power at break and the maximum power over all of the transients, the calculated secondary PCI margin according to the second methodology then depending on the minimum margin from among the power margins evaluated for each axial mesh of each fuel rod 24 of each fuel assembly 16.

During the following step 120, the second calculating module 44 calculates the modified secondary PCI margin for the modified loading pattern of the fuel assemblies 16 in the core 2.

The modified loading pattern for example differs from the reference loading pattern by at least one fuel assembly loaded into the core.

Alternatively, the fuel assemblies 16 loaded into the core are identical between the modified loading pattern and the reference loading pattern, the modified pattern then differing from the reference pattern by the position of at least two fuel assemblies in the core 2.

The modified secondary PCI margin is preferably calculated using the second methodology, called power at break methodology, i.e., as indicated previously for step 110, but with the modified loading pattern.

During the following step 130, the comparison module 46 then compares said modified secondary PCI margin with said reference secondary PCI margin, and validates, as modified principal PCI margin, the reference principal PCI margin previously calculated, when said modified secondary PCI margin is greater than or equal to said reference secondary PCI margin.

When said modified secondary PCI margin is less than said reference secondary PCI margin, the comparison module 46 calculates the modified principal PCI margin, the latter then having a value lower than that of the reference principal PCI margin previously calculated, for example by applying a corrective factor to said reference principal PCI margin. The corrective factor is for example a positive value subtracted from the reference principal PCI margin, or a multiplicative factor strictly between 0 and 1.

The corrective factor preferably depends on the deviation between the modified secondary PCI margin and the reference secondary PCI margin. The corrective factor for example depends on a ratio between the modified secondary PCI margin and the reference secondary PCI margin. The modified principal PCI margin is then for example obtained by multiplying the reference principal PCI margin by the modified secondary PCI margin and the reference secondary PCI margin.

This principal PCI margin value, in particular the modified principal PCI margin when the reactor 1 is loaded according to the modified pattern, is supplied to the operator of the nuclear reactor 1 having to carry out the modified loading pattern for adaptation, if necessary, of its operating technical specifications.

Optionally and additionally, from this value of the modified principal PCI margin, associated with the modified loading pattern, the determining module 48 then establishes emergency stop and/or alarm thresholds, and more generally uses the modified principal PCI margin to reduce, if applicable, the emergency stop and/or alarm thresholds to control the reactor 1.

Thus, the calculating method and the calculating system 40 according to the present disclosure make it possible to calculate a PCI margin, taking to account a variability of the loading patterns, considering for example a transitional load to or from the nominal load, such as a load corresponding to the startup of a first core, a rise to the breakeven point, a change of management of the operation of the reactor, or to an end-of-life cycle of a reactor, or a variation relative to the reference pattern.

The calculating method and the calculating system 40 according to the present disclosure also make it possible to adjust, if applicable, the settings for certain stoppage or alarm thresholds of the nuclear reactor 1 to lower values if necessary and to convert the deviation corresponding to the PCI margin to an authorized operating duration at intermediate power. It is thus possible to provide safe operation of the nuclear reactor 1, while best exploiting its capacities, in particular in case of prolonged operation at intermediate power (POIP).

The calculating method and the calculating system 40 according to the present disclosure thus allow a better match between fuel management and the maneuverability of the reactor 1 for the operator: choice of loading pattern, justification for transition cycles, possibility of extending POIP durations.

What is claimed is:

1. A method for calculating a pellet-cladding interaction margin associated with a loading pattern of a nuclear reactor comprising a core in which fuel assemblies are loaded according to the loading pattern, the fuel assemblies comprising fuel rods each including nuclear fuel pellets and a cladding surrounding the pellets,
    the method being implemented by an electronic system and comprising the following steps:
    b) calculating a reference principal pellet-cladding interaction margin for a reference loading pattern of the fuel assemblies in the core,
    c) calculating a reference secondary pellet-cladding interaction margin for the reference loading pattern,
    d) calculating a modified secondary pellet-cladding interaction margin for a modified loading pattern of the fuel assemblies in the core,
    e) calculating a modified principal pellet-cladding interaction margin for the modified loading pattern, depending on a comparison of the modified secondary pellet-cladding interaction margin with the reference secondary pellet-cladding interaction margin;
    the method further comprising controlling the state of the power balance of the nuclear reactor by using the calculated principal pellet-cladding interaction margin for a considered loading pattern of the fuel assemblies in the core to avoid rupture by pellet-cladding interaction of the claddings present in the core,
    wherein neutronic calculations and thermodynamic calculations are done to calculate each pellet-cladding interaction margin, and
    wherein the neutronic calculations and the thermomechanical calculations are coupled to calculate a corresponding principal pellet-cladding interaction margin, the thermomechanical calculations being uncoupled from the neutronic calculations to calculate a corresponding secondary pellet-cladding interaction margin.

2. The method according to claim 1, wherein the method further comprises the following step:
    f) determining a limit value to trigger an emergency stop and/or an alarm from the calculated principal pellet-cladding interaction margin and for the considered loading pattern of the fuel assemblies in the core.

3. The method according to claim 1, wherein when the modified secondary pellet-cladding interaction margin is greater than or equal to the reference secondary pellet-cladding interaction margin, the modified principal pellet-cladding interaction margin is equal to the reference principal pellet-cladding interaction margin, and when the modified secondary pellet-cladding interaction margin is less than the reference secondary pellet-cladding interaction margin, the modified principal pellet-cladding interaction margin is less than the reference principal pellet-cladding interaction margin.

4. The method according to claim 3, wherein, when the modified secondary pellet-cladding interaction margin is less than the reference secondary pellet-cladding interaction margin, the modified principal pellet-cladding interaction margin is equal to the reference principal pellet-cladding interaction margin reduced by a corrective factor depending on the deviation between the modified secondary pellet-cladding interaction margin and the reference secondary pellet-cladding interaction margin.

5. The method according to claim 4, wherein the corrective factor depends on a ratio between the modified secondary pellet-cladding interaction margin and the reference secondary pellet-cladding interaction margin and is strictly between 0 and 1.

6. The method according to claim 1, wherein step b) comprises the following sub-steps:
 b1) simulating at least one operating transient of the nuclear reactor,
 b2) calculating the value reached by at least one physical quantity during the operating transient in at least part of a cladding of a fuel rod, and
 b3) determining, as reference principal pellet-cladding interaction margin, the deviation between the maximum value reached by the value calculated in sub-step b2) during the transient and a technological limit of the fuel rod.

7. The method according to claim 6, wherein the transient simulated in sub-step b1) is a transient chosen from among the group consisting of:
 an excessive load increase,
 an uncontrolled withdrawal of at least one group of control clusters,
 a fall of one of the control clusters, and
 an uncontrolled boric acid dilution.

8. The method according to claim 6, wherein the method comprises, before step b), the following step:
 a) determining a rupture value of the physical quantity characterizing a rupture of the cladding.

9. The method according to claim 8, wherein step a) includes:
 subjecting previously irradiated fuel rods to experimental nuclear power ramps,
 calculating the values reached by the physical quantity in at least one cladding broken during a power ramp, and
 selecting the rupture value as being the minimum value from among the calculated values reached.

10. The method according to claim 6, wherein the physical quantity is chosen from among the group consisting of:
 a constraint or a constraint function in the cladding; and
 a deformation energy density in the cladding.

11. A non-transitory computer-readable medium including a computer program comprising software instructions which, when executed by a computer, carry out a method according to claim 1.

12. An electronic system for calculating a pellet-cladding interaction margin associated with a loading pattern of a nuclear reactor comprising a core in which fuel assemblies are loaded according to the loading pattern, the fuel assemblies comprising fuel rods each including nuclear fuel pellets and a cladding surrounding the pellets, the electronic system comprising:
 a first calculating module configured to calculate a reference principal pellet-cladding interaction margin for a reference loading pattern of the fuel assemblies in the core;
 a second calculating module configured to calculate, on the one hand, a reference secondary pellet-cladding interaction margin for the reference loading pattern, and on the other hand, a modified secondary margin for a modified loading pattern of the fuel assemblies in the core; and
 a comparison module configured to compare the modified secondary pellet-cladding interaction margin with the reference secondary pellet-cladding interaction margin,
 the comparison module further being configured to calculate a modified principal pellet-cladding interaction margin for the modified loading pattern, depending on the comparison of the modified secondary pellet-cladding interaction margin with the reference secondary pellet-cladding interaction margin,
 the electronic system configured for controlling the state of the power balance of the nuclear reactor by using the calculated principal pellet-cladding interaction margin for a considered loading pattern of the fuel assemblies in the core to avoid rupture by pellet-cladding interaction of the claddings present in the core,
 wherein neutronic calculations and thermodynamic calculations are done to calculate each pellet-cladding interaction margin, and
 wherein the neutronic calculations and the thermomechanical calculations are coupled to calculate a corresponding principal pellet-cladding interaction margin, the thermomechanical calculations being uncoupled from the neutronic calculations to calculate a corresponding secondary pellet-cladding interaction margin.

13. A method for calculating a pellet-cladding interaction margin associated with a loading pattern of a nuclear reactor comprising a core in which fuel assemblies are loaded according to the loading pattern, the fuel assemblies comprising fuel rods each including nuclear fuel pellets and a cladding surrounding the pellets,
 the method being implemented by an electronic system and comprising the following steps:
 a) determining a rupture value of the physical quantity characterizing a rupture of the cladding,
 b) calculating a reference principal pellet-cladding interaction margin for a reference loading pattern of the fuel assemblies in the core,
 c) calculating a reference secondary pellet-cladding interaction margin for the reference loading pattern,
 d) calculating a modified secondary pellet-cladding interaction margin for a modified loading pattern of the fuel assemblies in the core,
 e) calculating a modified principal pellet-cladding interaction margin for the modified loading pattern, depending on a comparison of the modified secondary pellet-cladding interaction margin with the reference secondary pellet-cladding interaction margin;

the method further comprising controlling the state of the power balance of the nuclear reactor by using the calculated principal pellet-cladding interaction margin for a considered loading pattern of the fuel assemblies in the core to avoid rupture by pellet-cladding interaction of the claddings present in the core;

wherein step b) comprises the following sub-steps:
   b1) simulating at least one operating transient of the nuclear reactor,
   b2) calculating the value reached by at least one physical quantity during the operating transient in at least part of a cladding of a fuel rod, and
   b3) determining, as reference principal pellet-cladding interaction margin, the deviation between the maximum value reached by the value calculated in sub-step b2) during the transient and a technological limit of the fuel rod;

wherein step a) includes:
   subjecting previously irradiated fuel rods to experimental nuclear power ramps,
   calculating the values reached by the physical quantity in at least one cladding broken during a power ramp, and
   selecting the rupture value as being the minimum value from among the calculated values reached;

wherein each of steps c) and d) includes, for each fuel assembly, the following sub-steps:
   i) simulating an evolution of the operation of the nuclear reactor by applying, to the fuel rods, a nuclear power ramp from the nil power,
   ii) calculating the values reached by a physical quantity in the claddings of the fuel rods,
   iii) comparing the values reached to the rupture value,
   iv) determining a power at break equal to:
      I) the power associated with the rupture value, if a minimum value from among the values reached calculated in sub-step ii) is equal to the rupture value, or
      II) infinity, if no value, from among the values reached calculated in sub-step ii), is equal to the rupture value,
   v) evaluating a power margin by difference between the power at break determined in sub-step iv) and an estimated maximum power in the fuel assembly, the corresponding secondary pellet-cladding interaction margin, calculated during each of steps c) and d), being equal to the minimum margin from among the power margins evaluated for the fuel assemblies in sub-step v).

* * * * *